US007535590B2

(12) United States Patent
Yoshida

(10) Patent No.: US 7,535,590 B2
(45) Date of Patent: *May 19, 2009

(54) FACSIMILE APPARATUS, CONTROL METHOD THEREFOR, AND COMPUTER-READABLE STORAGE MEDIUM

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/859,859

(22) Filed: Sep. 24, 2007

(65) Prior Publication Data

US 2008/0088870 A1 Apr. 17, 2008

Related U.S. Application Data

(60) Continuation of application No. 10/917,323, filed on Aug. 13, 2004, now Pat. No. 7,375,839, which is a division of application No. 09/417,068, filed on Oct. 13, 1999, now Pat. No. 6,853,462.

(30) Foreign Application Priority Data

Oct. 13, 1998 (JP) .................................. 10-290951

(51) Int. Cl.
G06F 15/00 (2006.01)
H04N 1/00 (2006.01)

(52) U.S. Cl. ....................................... 358/1.15; 358/402

(58) Field of Classification Search .................. 358/1.1, 358/1.13, 1.15, 402, 442, 449; 399/370
See application file for complete search history.

(56) References Cited

U.S. PATENT DOCUMENTS 4,081,843 A 3/1978 Okano ........................ 358/485

| 4,814,894 | A | | 3/1989 | Yoshida | 358/426.02 |
|---|---|---|---|---|---|
| 4,845,569 | A | * | 7/1989 | Kurahayashi et al. | 358/400 |
| 5,712,907 | A | | 1/1998 | Wegner | 358/402 |
| 5,905,783 | A | | 5/1999 | Tonegawa | 379/100.07 |
| 6,028,679 | A | | 2/2000 | Murphy | 358/407 |
| 6,097,797 | A | | 8/2000 | Oseto | 379/100.08 |
| 6,101,244 | A | | 8/2000 | Okada | 379/100.08 |
| 6,185,604 | B1 | | 2/2001 | Sekiguchi | 709/206 |
| 6,211,972 | B1 | | 4/2001 | Okutomi et al. | 358/402 |
| 6,240,445 | B1 | | 5/2001 | Kumar et al. | 709/206 |
| 6,259,533 | B1 | | 7/2001 | Toyoda et al. | 358/1.15 |
| 6,268,937 | B1 | | 7/2001 | Kim | 358/488 |

(Continued)

FOREIGN PATENT DOCUMENTS

JP 04-354257 12/1992

(Continued)

*Primary Examiner*—Kimberly A Williams
(74) *Attorney, Agent, or Firm*—Fitzpatrick, Cella, Harper & Scinto

(57) ABSTRACT

In facsimile-communicating an original when the Internet selection state in an operation unit is set to "automatic selection", the original is communicated by selecting the e-mail-based Internet for an A4 original size, and the session-based Internet for a B4 or A3 original size. At the same time, the original information is transmitted in accordance with the transmission mode of its own apparatus, the encoding method determined based on the reception capability of a facsimile apparatus at a reception destination, and the receiving-side output original size and resolution.

11 Claims, 7 Drawing Sheets

U.S. PATENT DOCUMENTS

| | | | |
|---|---|---|---|
| 6,308,023 B1 | 10/2001 | Nomura | 399/81 |
| 6,519,247 B1 | 2/2003 | Yoshida | 370/352 |
| 6,714,315 B1 | 3/2004 | Yoshida | 358/1.18 |
| 6,804,021 B1 | 10/2004 | Yoshida | 358/1.15 |
| 6,853,462 B1 | 2/2005 | Yoshida | 358/1.15 |
| 2003/0217178 A1 | 11/2003 | Yoshimura | 709/239 |
| 2005/0012959 A1 | 1/2005 | Yoshida | 358/1.15 |
| 2006/0083533 A1 | 4/2006 | Maeshima | 399/82 |

FOREIGN PATENT DOCUMENTS

| | | |
|---|---|---|
| JP | 06-030229 | 2/1994 |
| JP | 06-253123 | 9/1994 |
| JP | 10-032671 | 2/1998 |
| JP | 2000-49999 | 2/2000 |

\* cited by examiner

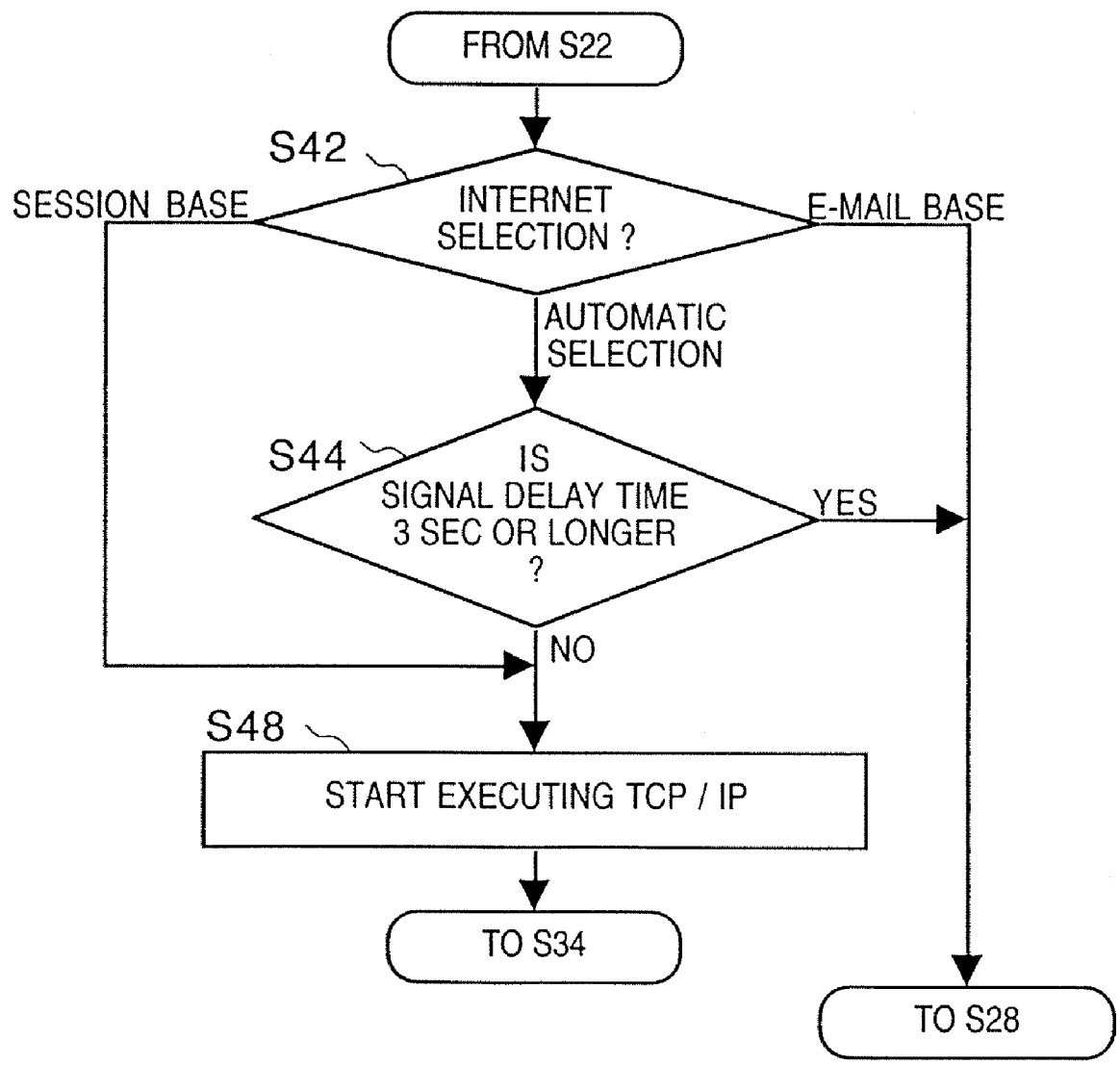

FACSIMILE APPARATUS, CONTROL METHOD THEREFOR, AND COMPUTER-READABLE STORAGE MEDIUM

RELATED APPLICATIONS

This application is a continuation of application Ser. No. 10/917,323, filed on Aug. 13, 2004, which is a division of application Ser. No. 09/417,068, filed on Oct. 13, 1999, the entire disclosure of both of which is incorporated herein by reference. Moreover, priority is hereby claimed under 35 U.S.C. § 119 based upon Japanese Priority Application No. 10-290951, filed on Oct. 13, 1998.

BACKGROUND OF THE INVENTION

1. Field of the Invention

The present invention relates to a facsimile apparatus capable of performing facsimile communication via the Internet, control method therefor, and computer-readable storage medium.

2. Description of the Related Art

In recent years, facsimile apparatuses using the e-mail (electronic mail)-based Internet or session-based Internet are proposed as a facsimile apparatus capable of performing facsimile communication via the Internet.

However, even the ITU-T does not recommend any standard of facsimile communication via the conventional Internet, and each manufacturer is developing such facsimile apparatuses based on its own standard. For this reason, facsimile communication via the Internet can only be realized between apparatuses made by the same manufacturer.

E-mail-based facsimile communication via the Internet can only communicate in a so-called primitive mode. Session-based facsimile communication via the Internet fails in communication if transmission data is delayed in the Internet.

SUMMARY OF THE INVENTION

It is an object of the present invention to provide a facsimile apparatus for reliably transmitting information of a target original by facsimile communication via the Internet, control method therefor, and computer-readable storage medium.

To achieve the above object, a facsimile apparatus according to the present invention comprises the following arrangement.

That is, a facsimile apparatus capable of performing facsimile communication via the Internet, comprises communication means capable of performing session-based facsimile communication and e-mail-based facsimile communication via the Internet, and control means for selecting either one of session-based data communication form and e-mail-based data communication form in accordance with a selected transmission mode, and causing the communication means to execute facsimile communication in accordance with the selected data communication form.

For example, when the transmission mode is set to automatic selection, the control means preferably selects the e-mail-based data communication form for an A4 original size, and the session-based data communication form for a B4 or A3 original size.

To achieve the above object, a facsimile apparatus control method according to the present invention comprises the following steps.

That is, a facsimile apparatus control method capable of performing facsimile communication via the Internet, comprises the steps of selecting either one of session-based data communication form and e-mail-based data communication form in accordance with a selected transmission mode, and causing a communication unit capable of performing session-based facsimile communication and e-mail-based facsimile communication to execute facsimile communication in accordance with the selected data communication form.

In this control method, when the transmission mode is set to automatic selection, it is preferable that the e-mail-based data communication form be selected for an A4 original size, and the session-based data communication form be selected for a B4 or A3 original size.

Further, there is provided a computer-readable storage medium capable of realizing the facsimile apparatus and control method therefor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS.

FIG. 7 is a flow chart showing the feature of communication network selection control in a control unit according to the second embodiment of the present invention.

DETAILED DESCRIPTION OF THE PREFERRED EMBODIMENTS

Preferred embodiments of a facsimile apparatus according to the present invention will be described in detail below with reference to the accompanying drawings.

First Embodiment

Figure 1:
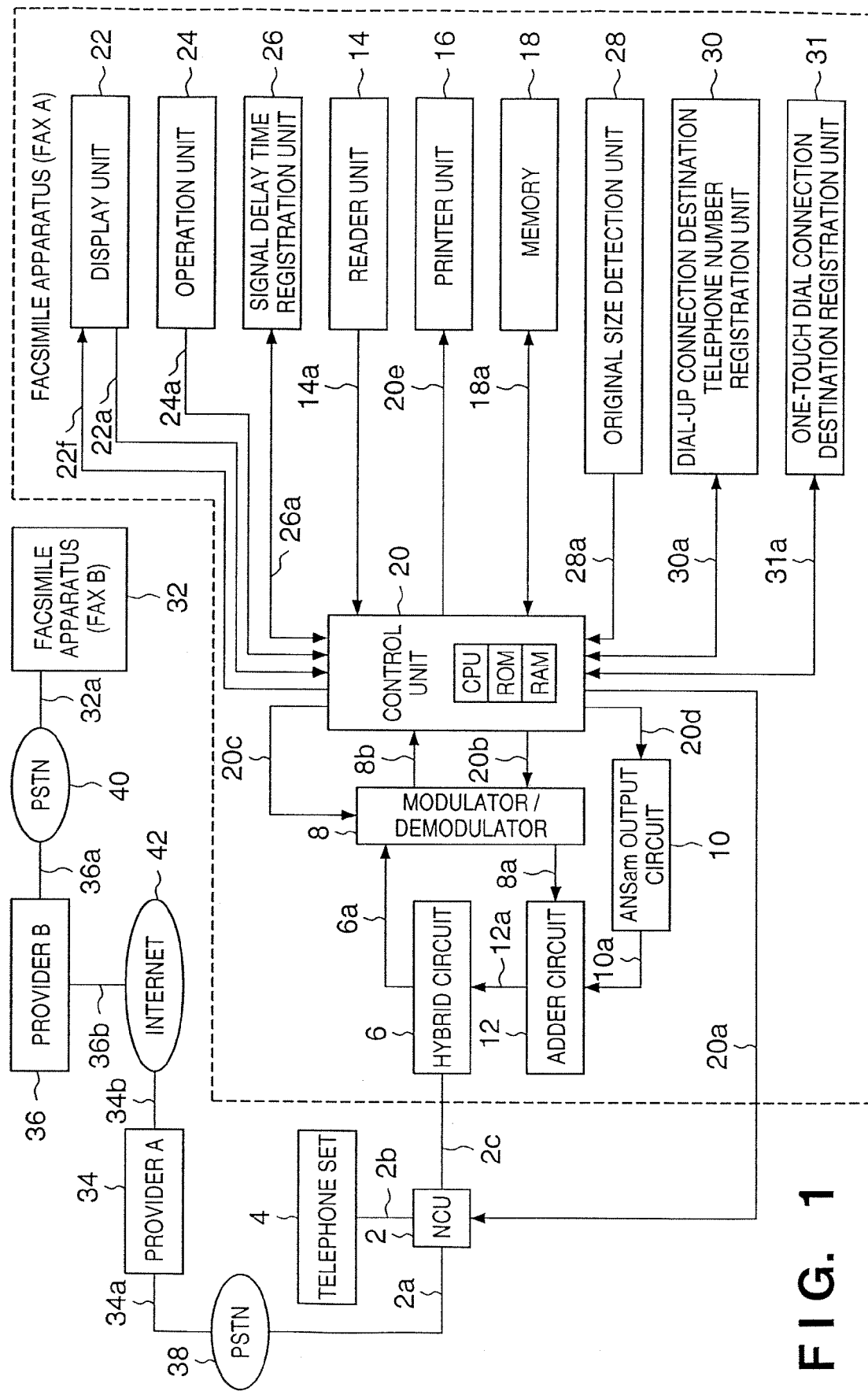
FIG. 1 is a block diagram showing the whole arrangement of a facsimile system including a facsimile apparatus according to the first embodiment of the present invention.

FIG. 1 is a block diagram showing the whole arrangement of a facsimile system including a facsimile apparatus according to the first embodiment of the present invention. The arrangement of a facsimile apparatus (FAX) A connected to this system is shown within the broken frame.

In FIG. 1, reference numeral 2 denotes an NCU (Net Control Unit) which is connected to a public switched telephone network (PSTN) 38 and telephone line terminal (telephone set 4), and controls connection to the public switched telephone network, switching to a data communication path, and holding of the loop in order to use the PSTN for data communication and the like. The NCU 2 connects a telephone line 2a to the telephone set side if a signal level output from a control unit 20 (to be described later) via a signal line 20a is "0", and to the facsimile apparatus side if the signal level is "1". In a normal state, the telephone line 2a is connected to the telephone set side.

The facsimile system comprises the telephone set 4. Reference numeral 6 denotes a hybrid circuit for separating a signal of transmission system and a signal of reception system by a general method, transmitting a transmission signal from an adder circuit 12 (to be described later) to the telephone line 2a via the NCU 2, and receiving a reception signal from a partner side via the NCU 2 to transmit the reception signal to a modulator/demodulator 8 (to be described later) via a signal line 6a.

The modulator/demodulator 8 modulates/demodulates data based on the ITU-T recommendations V.8, V.21, V.27ter, V.29, V.17, and V.34. The modulator/demodulator 8 modulates transmission data output to a signal line 20b to output the modulated data to a signal line 8a, and demodulates reception data output to the signal line 6a to output the demodulated data to a signal line 8b. The transmission mode of the modulator/demodulator 8 is designated in accordance with a signal output from the control unit 20 (to be described later) via a signal line 20c.

Reference numeral 10 denotes an ANSam output circuit for transmitting an ANSam signal based on the ITU-T recommendation. The ANSam output circuit 10 outputs the ANSam signal to a signal line 10a when a signal of signal level "1" is output to a signal line 20d, and does not output any signal to the signal line 10a when a signal of signal level "0" is output to the signal line 20d.

The adder circuit 12 receives information on the signal line 8a and information on the signal line 10a, and outputs the sum of these pieces of input information to a signal line 12a.

Reference numeral 14 denotes a reader unit for outputting to a signal line 14a image data obtained by reading an original set on an original table (not shown) by general procedures.

Reference numeral 16 denotes a printer unit for line-sequentially printing information output to a signal line 20e.

Reference numeral 18 denotes a memory for storing image data read by the reader unit 14, data obtained by encoding the image data, externally received data, data obtained by decoding the received data, and the like.

Reference numeral 24 denotes an operation unit which includes a one-touch dial key, abbreviated dial key, ten-key pad, * and # keys, set key, start key, stop key, registration key for registering a dial-up connection telephone number, transmission mode selection button, and various function keys, and outputs a pulse signal to a signal line 24a in accordance with a pressed key. The transmission mode includes three, "automatic", "e-mail-based", and "session-based" modes.

Reference numeral 22 denotes a display unit for displaying the Internet selection state and the like. When a clear pulse is generated on a signal line 22f, the display unit 22 displays "automatic selection". Then, the display unit 22 displays "e-mail-based communication via the Internet is selected" or "session-based communication via the Internet is selected" depending on a pulse signal output to the signal line 24a in accordance with transmission mode selection operation via the operation unit 24. The display unit 22 outputs to a signal line 22a a signal "0" when "automatic selection" is displayed, a signal "1" when "e-mail-based communication via the Internet is selected" is displayed, and a signal "2" when "session-based communication via the Internet is selected" is displayed.

Reference numeral 26 denotes a signal delay time registration unit for registering via a signal line 26a a signal delay time used to communicate via the Internet. In the signal delay time registration unit 26, signal delay times can be individually registered for all one-touch dial destinations.

Reference numeral 28 denotes an original size detection unit for detecting the original size set on the original table (not shown). The original size detection unit 28 outputs a signal "0" to a signal line 28a when an A4-size original is set, a signal "1" when a B4-size original is set, and a signal "2" when an A3-size original is set.

Reference numeral 30 denotes a dial-up connection destination telephone number registration unit for registering via a signal line 32a a telephone number to be dialed up.

Reference numeral 31 denotes a one-touch dial connection destination registration unit for registering the IP address of a provider at a connection destination that is input via the ten-key pad (not shown) of the operation unit 24, and information of a telephone number transmitted from the provider using the PSTN, via a signal line 31a in correspondence with the one-touch dial (not shown) of the operation unit 24.

Reference numeral 32 denotes a facsimile apparatus (FAX B); 34, an Internet service provider (to be referred to as a provider) A; 36, a provider B; 38 and 40, PSTNs; and 42, the Internet.

The facsimile apparatus A comprises the control unit 20 which controls the respective units of the facsimile apparatus A, and determines based on the transmission mode input via the operation unit 24 whether session-base facsimile communication via the Internet is executed or e-mail-based facsimile communication via the Internet is executed. More specifically, in the "automatic selection" transmission mode, the control unit 20 executes e-mail-based facsimile communication via the Internet for an A4 original size, and session-based facsimile communication via the Internet for a B4 or A3 original size.

Note that the control unit 20 is constituted by a CPU for controlling the whole facsimile apparatus A in accordance with programs, ROM storing the programs and control codes of the CPU, and RAM having a work area used when the CPU executes control, and areas for various tables and the like.

Figure 2:
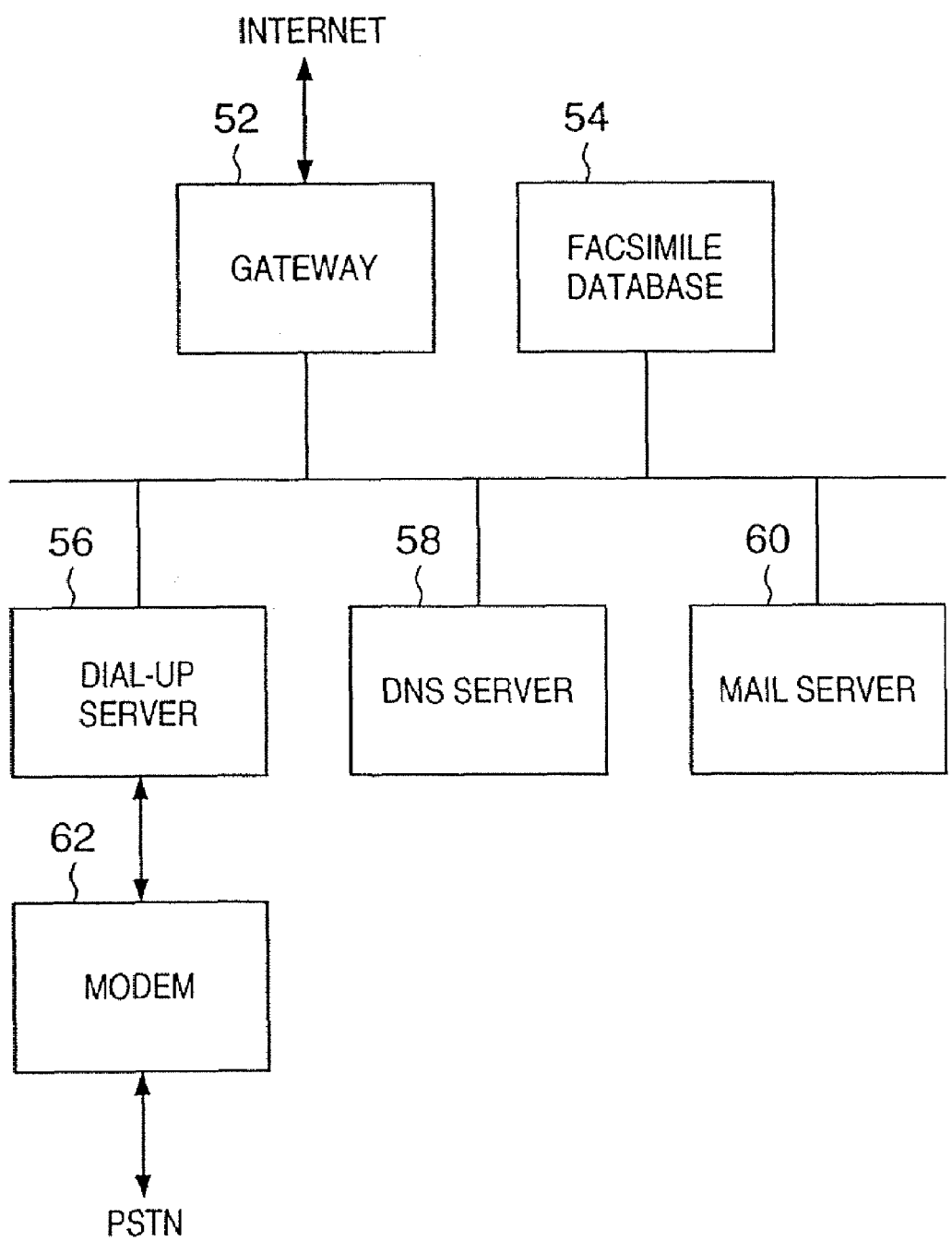
FIG. 2 is a block diagram showing the arrangement of a provider included in the facsimile system according to the first embodiment of the present invention.
Figure 3:
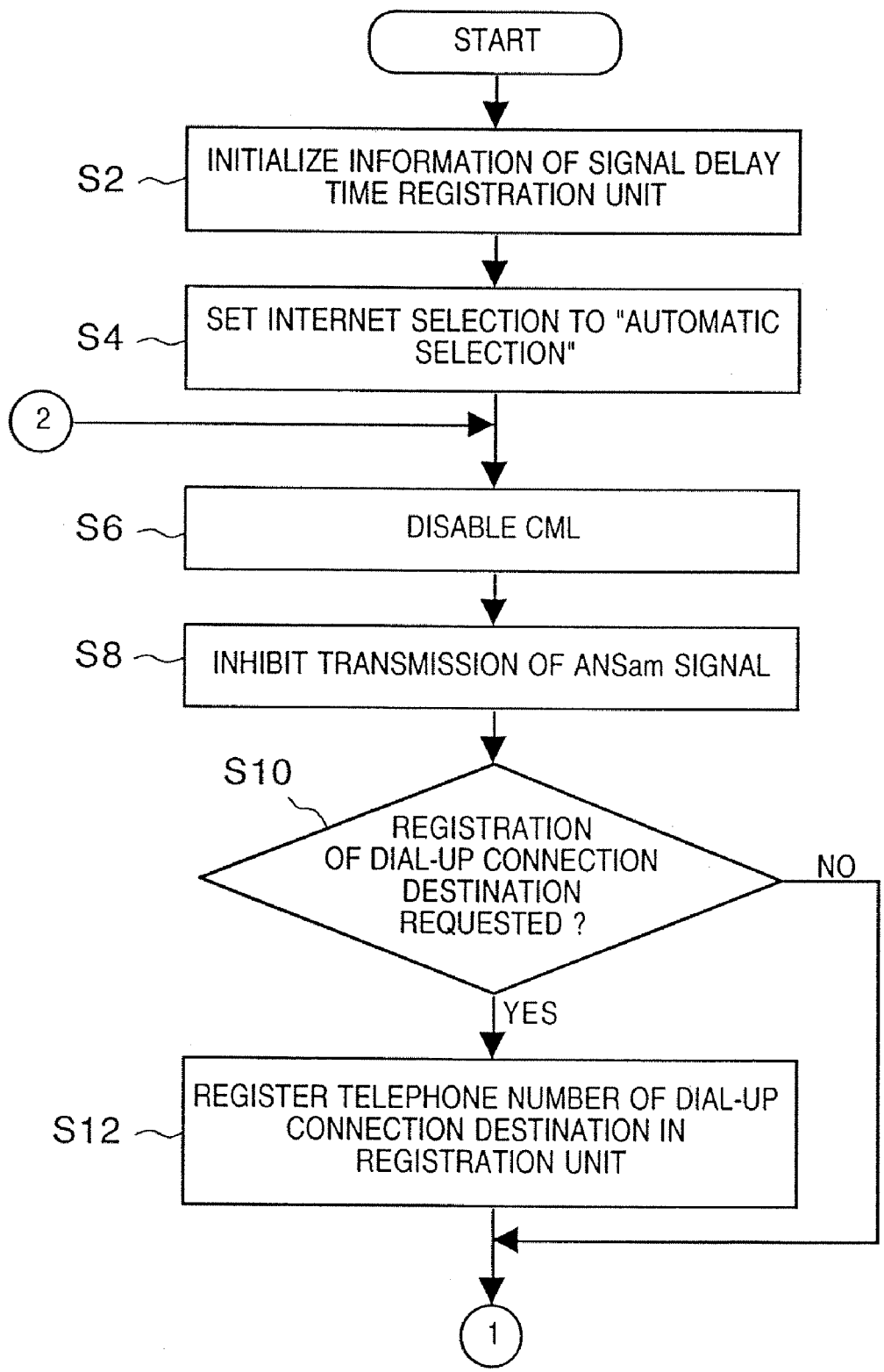
FIG. 3 is a flow chart showing communication network selection control in a control unit according to the first embodiment of the present invention.
Figure 4:
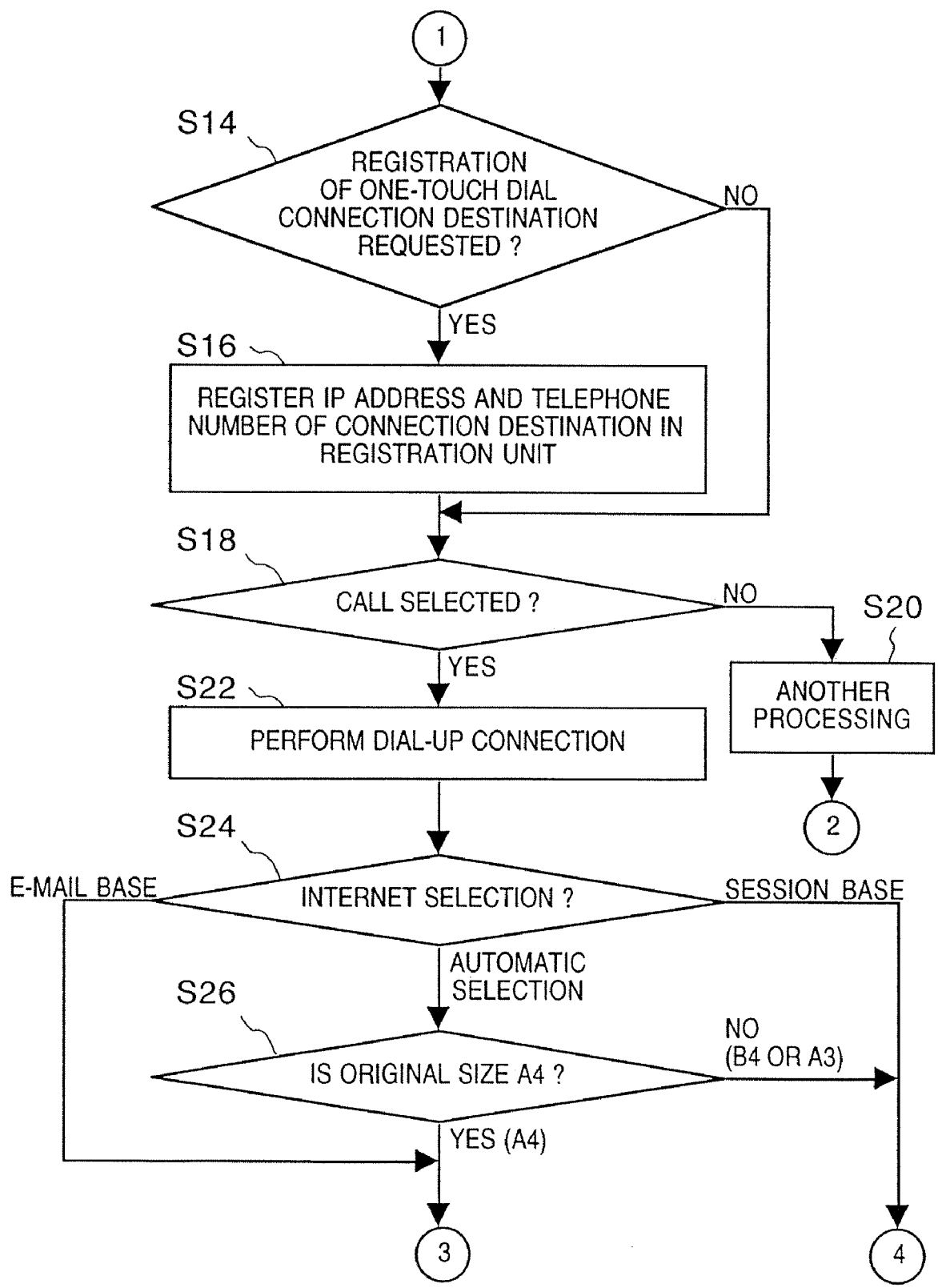
FIG. 4 is a flow chart showing communication network selection control in the control unit according to the first embodiment of the present invention.
Figure 5:
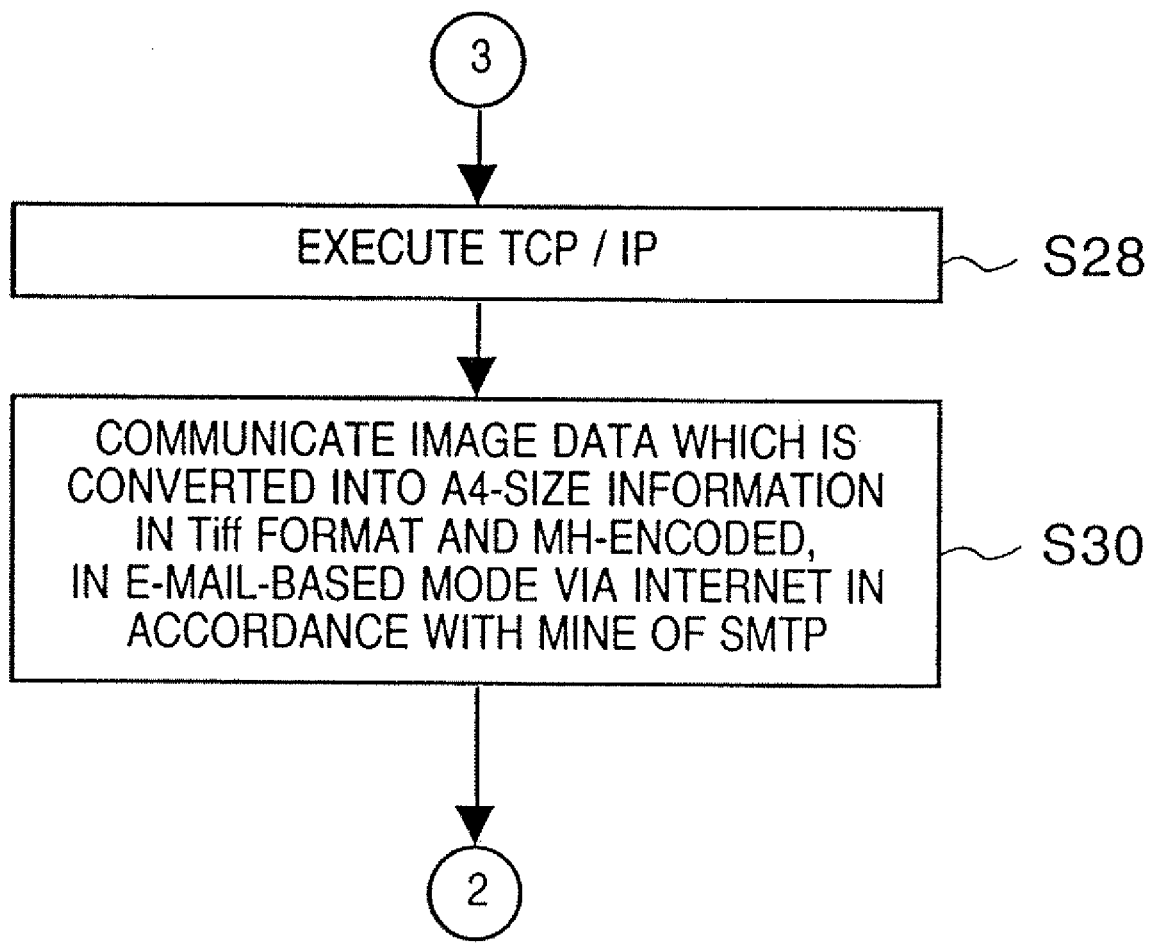
FIG. 5 is a flow chart showing communication network selection control in the control unit according to the first embodiment of the present invention.
Figure 6:
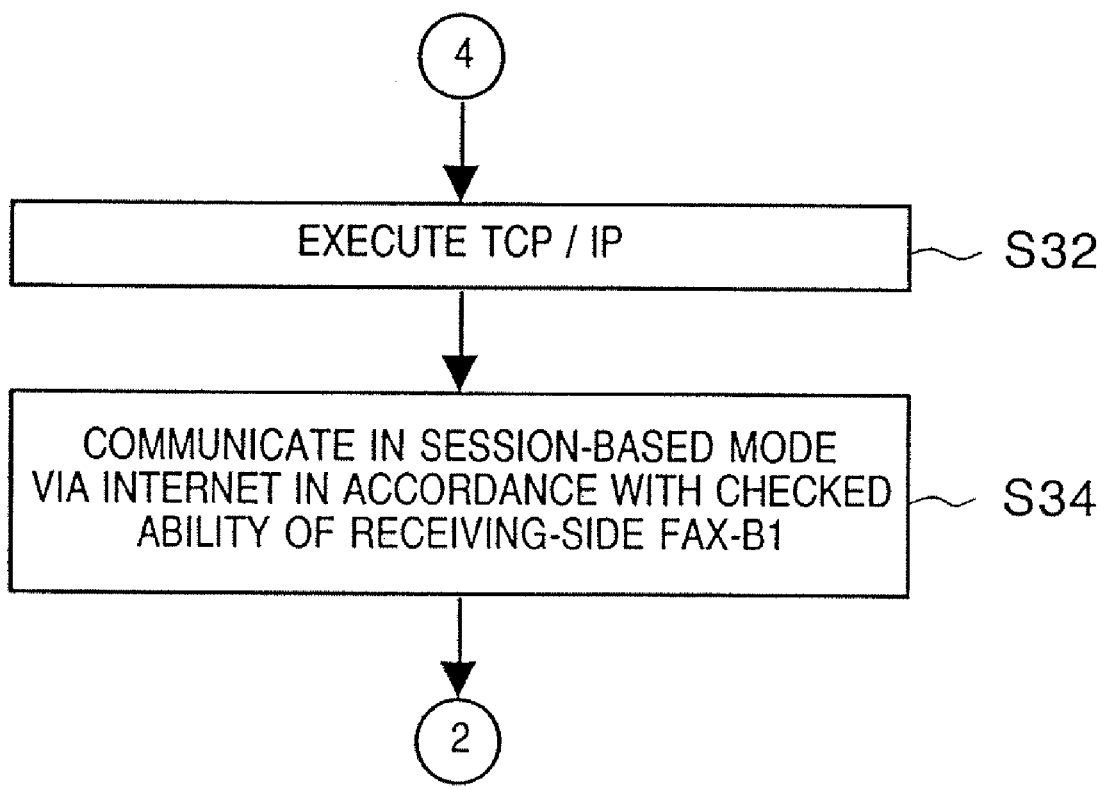
FIG. 6 is a flow chart showing communication network selection control in the control unit according to the first embodiment of the present invention.

FIG. 2 is a block diagram showing the arrangement of a provider included in the facsimile system according to the first embodiment of the present invention.

In FIG. 2, reference numeral 52 denotes a gateway for connecting the facsimile apparatus to another network organization on the Internet; 54, a facsimile database for storing the reception capabilities and reception status information of a plurality of facsimile apparatuses connected to the provider by dial-up operation; 56, a dial-up server for connecting the facsimile apparatus to a client via a modem 62 and PSTN in accordance with a communication protocol such as PPP; 58, a DNS (Domain Name System) server for providing domain name services; and 60, a mail server for storing e-mail and facsimile information transmitted/received using SMTP (Simple Mail Transfer Protocol) as the host protocol of TCP/IP (Transmission Control Protocol/Internet Protocol).

Communication network selection control executed by the CPU of the control unit 20 will be explained with reference to FIGS. 3 to 6.

FIGS. 3 to 6 are flow charts, respectively, showing communication network selection control in the control unit according to the first embodiment of the present invention.

Step S2: The CPU initializes the signal delay time registration unit 26 via the signal line 26a.

Step S4: The CPU outputs a clear pulse to the signal line 22f to change the Internet selection state displayed on the display unit 22 to "automatic selection".

Step S6: The CPU outputs a signal of signal level "0" to the signal line 20a to disable CML (Connect Modem to Line).

Step S8: The CPU outputs a signal of signal level "0" to the signal line 20d not to transmit any ANSam signal.

Step S10: The CPU checks on the basis of information output from the operation unit 24 to the signal line 24a whether registration of a dial-up connection destination in the dial-up connection destination registration unit 30 is requested. If NO (registration is not requested) in step S10, the CPU advances to step S14.

Step S12: If YES (registration is requested) in step S10, the CPU registers in the registration unit 30 via the signal line 30a the telephone number of a connection destination to be connected by dial-up operation that is input via the operation unit 24.

Step S14: The CPU checks on the basis of information output from the operation unit 24 to the signal line 24a whether registration of a one-touch dial in the one-touch dial connection destination telephone number registration unit 31 is requested. If NO (registration is not requested) in step S14, the CPU advances to step S18.

Step S16: If YES (registration is requested) in step S14, the CPU registers in the registration unit 31 via the signal line 31a the IP address of a connection destination to be connected by the one-touch dial, and a telephone number for connecting the facsimile apparatus to the provider connected by the IP address, which IP address and telephone number are input via the operation unit 24.

Steps S18 and S20: The CPU checks on the basis of information on the signal line 31a whether a call is selected (step S18). If NO (no call is selected) in step S18, the CPU performs another predetermined processing in step S20.

Step S22: If YES (call is selected) in step S18, the CPU dials a telephone number to be dialed up on the basis of information on the signal line 31a to perform dial-up connection.

Step S24: The CPU checks which type of Internet for facsimile communication is selected on the basis of information on the signal line 24a. If "automatic selection" is selected, the CPU advances to step S26; if "e-mail-based Internet" is selected, to step S28; or if "session-based Internet" is selected, to step S32.

Step S26: If "automatic selection" is selected in step S24, the CPU checks the original size placed on the original table (not shown) on the basis of information on the signal line 28a. If the original size is A4, the CPU advances to step S28; or if the original size is B4 or A3, to step S32.

Step S28: The CPU starts executing TCP/IP.

Step S30: The CPU converts image data read by the reader unit 14 or image data printed at the printer unit 16 into A4-size information on the basis of a Tiff (Tag image file format) format, and transmits the MH-encoded image data obtained by this conversion via the e-mail-based Internet in accordance with MIME (Multipurpose Internet Mail Extensions) of SMTP.

Step S32: The CPU starts executing TCP/IP.

Step S34: The CPU obtains data representing the reception capability of the receiving-side facsimile apparatus B from the facsimile database 54 of the provider, and determines the encoding method and the receiving-side output original size and resolution on the basis of the obtained data and the transmission mode of the transmitting-side apparatus (facsimile apparatus A). In the first embodiment, for example, if the CPU determines that it is unsuitable to transmit a B4- or A3-size original at an equal magnification, the CPU reduces the original data to A4-size data. The CPU transmits image data read by the reader unit 14 or image data printed at the printer unit 16 via the session-based Internet in accordance with determined transmission specifications.

According to the first embodiment, in facsimile-communicating an original when the Internet selection state on the operation unit 24 is "automatic selection", the original is communicated by selecting the e-mail-based Internet for an A4 original size, and the session-based Internet for a B4 or A3 original size. At the same time, original information is transmitted in accordance with the transmission mode of its own apparatus, the encoding method determined based on the reception capability of a facsimile apparatus at a reception destination, and the receiving-side output original size and resolution. Although the original size may change between the transmitting side and receiving side, original information can be transmitted as transmission data coping with the receiving-side reception capability, and original information to be facsimile-communicated can be reliably transmitted to the receiving side.

Second Embodiment

The second embodiment will be described. A difference from the first embodiment will be mainly described in the second embodiment, and a repetitive description thereof will be omitted. The second embodiment selects the session-based Internet when the signal delay time to a calling destination is shorter than a predetermined time, and selects the e-mail-based Internet when the signal delay time is longer than the predetermined time. More specifically, the signal delay time of each calling destination is registered in a signal delay time registration unit 26 in advance. In facsimile communication via the Internet, which type of Internet is selected is determined based on the signal delay time of the calling destination registered in the signal delay time registration unit 26.

FIG. 7 is a flow chart showing the feature of communication network selection control in a control unit according to the second embodiment of the present invention.

Step S42: The CPU checks which type of Internet for facsimile communication is selected on the basis of information on a signal line 24a. If "automatic selection" is selected, the CPU advances to step S44; if "e-mail-based Internet" is selected, to step S28 in FIG. 5; or if "session-based Internet" is selected, to step S48.

Step S44: The CPU receives via a signal line 26a the signal delay time of each calling destination registered in advance in the signal delay time registration unit 26. The CPU checks whether the signal delay time of the current calling destination is, e.g., 3 sec or longer. If YES (signal delay time is equal to or longer than 3 sec) in step S44, the CPU executes TCP/IP (step S28) and communicates via the e-mail-based Internet (step S30).

Step S48: If NO (signal delay time is shorter than 3 sec or is not registered) in step S44, the CPU registers the determination result in a one-touch dial connection destination telephone number registration unit 31 in correspondence with the calling destination. At the same time, the CPU starts executing TCP/IP. The CPU advances to step S34 to communicate via the session-based Internet.

In the second embodiment, the current determination result is registered in the one-touch dial connection destination telephone number registration unit 31 in step S48. So long as facsimile communication is done for the same calling destination in next and subsequent operations, Internet selection information registered in the registration unit 31 can be used upon one-touch dialing of the calling destination. This can eliminate Internet selection based on the signal delay time.

According to the second embodiment, when the signal delay time of each calling destination registered in the signal delay time registration unit 26 is longer than a predetermined time, the facsimile apparatus communicates via the e-mail-based Internet. This can prevent any conventional communication error owing to a delay on the Internet.

Other Embodiments

The object of the present invention is realized even by supplying a storage medium storing software program codes for realizing the functions of the above-described embodiments to a system or apparatus, and causing the computer (or a CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, each of the above-described embodiments can provide a facsimile apparatus for reliably transmitting information of a target original by facsimile communication via the Internet, control method therefor, and computer-readable storage medium.

Note that the facsimile apparatus according to each of the above-described embodiments is connected to the provider by dial-up operation prior to Internet communication. However, the present invention is not limited to this system configuration, and can also be applied to a facsimile apparatus for performing Internet communication via a leased line.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus with a function for performing facsimile communication via the Internet, comprising:
    a selecting unit configured to select either a first facsimile communication based on e-mail via the Internet or a second facsimile communication not based on e-mail via the Internet;
    a communication unit configured to transmit data through the first or second facsimile communication selected by said selecting unit;
    a converting unit configured to convert the data to be transmitted into a predetermined size if size of the data is not the predetermined size; and
    a control unit configured to cause said communication unit to transmit the data converted into the predetermined size by said converting unit in a case where the first facsimile communication is selected, and cause said communication unit to transmit the data that is not converted into the predetermined size, even if the size of the data is not the predetermined size, in a case where the second facsimile communication is selected.

2. The facsimile apparatus according to claim 1, wherein the second facsimile communication is a session-based facsimile communication.

3. The facsimile apparatus according to claim 1, wherein said converting unit converts the data into A4 size as the predetermined size if the size of the data is not A4 size.

4. The facsimile apparatus according to claim 1, further comprising:
    a reading unit configured to read an original and output data corresponding to the original; and
    a detecting unit configured to detect size of the original,
    wherein said communication unit transmits the data that is output by said reading unit, and said converting unit converts the data into the predetermined size if the detected size of the original is not the predetermined size.

5. The facsimile apparatus according to claim 1, wherein said control unit causes said communication unit to transmit the data which is converted in accordance with a receiving function of a receiving apparatus to which the data is transmitted in the case where the second facsimile communication is selected.

6. A method of controlling a facsimile apparatus with a function for performing facsimile communication via the Internet, said method comprising the steps of:
    selecting either a first facsimile communication based on e-mail via the Internet or a second facsimile communication not based on e-mail via the Internet;
    transmitting data through the selected first or second facsimile communication;
    converting the data to be transmitted into a predetermined size if size of the data is not the predetermined size; and
    transmitting the converted data in a case where the first facsimile communication is selected, and transmitting the data that is not converted into the predetermined size, even if the size of the data is not the predetermined size, in a case where the second facsimile communication is selected.

7. The method according to claim 6, wherein the second facsimile communication is a session-based facsimile communication.

8. The method according to claim 6, wherein the data is converted into A4 size as the predetermined size if the size of the data is not A4 size.

9. The method according to claim 6, further comprising the steps of:
    reading an original to generate data to be transmitted;
    detecting size of the original; and
    determining if the detected size of the original is not the predetermined size.

10. The method according to claim 6, wherein the data is converted in accordance with a receiving function of a receiving apparatus to which the data is transmitted in the case where the second facsimile communication is selected.

11. A computer-readable storage medium storing a computer program which executes a method of controlling a facsimile apparatus with a function for performing facsimile communication via the Internet, the method comprising steps of:
    selecting either a first facsimile communication based on e-mail via the Internet or a second facsimile communication not based on e-mail via the Internet;

transmitting data through the selected first or second facsimile communication;

converting the data to be transmitted into a predetermined size if size of the data is not the predetermined size; and transmitting the converted data in a case where the first facsimile communication is selected, and transmitting the data that is not converted into the predetermined size, even if the size of the data is not the predetermined size, in a case where the second facsimile communication is selected.

* * * * *